United States Patent
Aalto (10) Patent No.: US 7,469,084 B2
(45) Date of Patent: Dec. 23, 2008

(54) STRUCTURE COMPRISING AN ADIABATIC COUPLER FOR ADIABATIC COUPLING OF LIGHT BETWEEN TWO OPTICAL WAVEGUIDES AND METHOD FOR MANUFACTURING SUCH A STRUCTURE

(75) Inventor: Timo Aalto, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 11/579,581

(22) PCT Filed: May 18, 2004

(86) PCT No.: PCT/FI2004/000299

§ 371 (c)(1),
(2), (4) Date: Jul. 19, 2007

(87) PCT Pub. No.: WO2005/111680

PCT Pub. Date: Nov. 24, 2005

(65) Prior Publication Data

US 2007/0286552 A1    Dec. 13, 2007

(51) Int. Cl.
G02B 6/26    (2006.01)
G02B 6/30    (2006.01)
G02B 6/10    (2006.01)

(52) U.S. Cl. ............... 385/50; 385/28; 385/43; 385/49; 385/130

(58) Field of Classification Search ........... None
See application file for complete search history.

(56) References Cited

U.S. PATENT DOCUMENTS

| 5,199,092 | A * | 3/1993 | Stegmueller | 385/50 |
| 6,108,478 | A * | 8/2000 | Harpin et al. | 385/129 |
| 6,229,947 | B1  | 5/2001 | Vawter et al. | |
| 6,253,099 | B1 * | 6/2001 | Oskin et al. | 600/372 |
| 6,282,345 | B1  | 8/2001 | Schimpe | |
| 6,310,995 | B1  | 10/2001 | Saini et al. | |
| 6,411,764 | B1 * | 6/2002 | Lee | 385/131 |
| 6,643,419 | B2  | 11/2003 | Chang et al. | |
| 6,760,520 | B1 * | 7/2004 | Medin et al. | 385/43 |
| 7,079,727 | B1 * | 7/2006 | Little | 385/28 |
| 2002/0039469 | A1 * | 4/2002 | Jeong et al. | 385/43 |
| 2002/0085602 | A1 * | 7/2002 | Park et al. | 372/43 |
| 2003/0044118 | A1 * | 3/2003 | Zhou et al. | 385/43 |
| 2003/0053756 | A1 * | 3/2003 | Lam et al. | 385/49 |
| 2004/0017976 | A1 * | 1/2004 | Luo et al. | 385/43 |

* cited by examiner

Primary Examiner—Tina M Wong
(74) Attorney, Agent, or Firm—Frommer Lawrence & Haug LLP; Ronald R. Santucci (57) ABSTRACT

A structure comprises an inner strip waveguide (1) and an outer rib waveguide (2) on a common substrate. The thicker inner waveguide (1) is patterned into an inner core layer (3). The thinner outer waveguide (2) is patterned into an outer core layer (4). The inner and outer waveguides are separated by a gap (5) being less than 500 nm. The structure forms an adiabatic coupler. In the method, the first (inner) waveguide (1) is patterned into the thicker inner core layer (3) by etching trenches (8). A thinner outer silicon layer (4) is attached on top of the inner-core layer (3) and the first waveguide (1) to form an outer core layer (4). The second (outer) waveguide (2) is patterned into the outer core layer (4).

21 Claims, 6 Drawing Sheets

| $W_1$: | 3 µm | 2.95 µm | 2.9 µm | 2.85 µm | 2.8 µm |

STRUCTURE COMPRISING AN ADIABATIC COUPLER FOR ADIABATIC COUPLING OF LIGHT BETWEEN TWO OPTICAL WAVEGUIDES AND METHOD FOR MANUFACTURING SUCH A STRUCTURE

This application is a 371 of PCT/FI2004/000299 filed on May 18, 2004, published on Nov. 24, 2005 under publication number WO 2005/111680 A1.

FIELD OF THE INVENTION

The invention relates to integrated optics and the subject of the invention is a structure for coupling light between two different and superimposed waveguides, and a method for producing the structure. The invention is described primarily in relation to silicon waveguides (for example fabricated by photolithography and dry-etching of silicon-on-insulator layers), but it is applicable to semiconductor waveguides generally.

BACKGROUND OF THE INVENTION

Figure 1A:
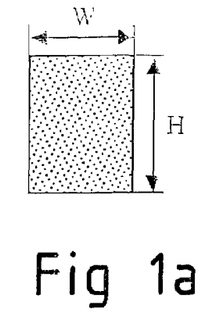
Figure 1B:
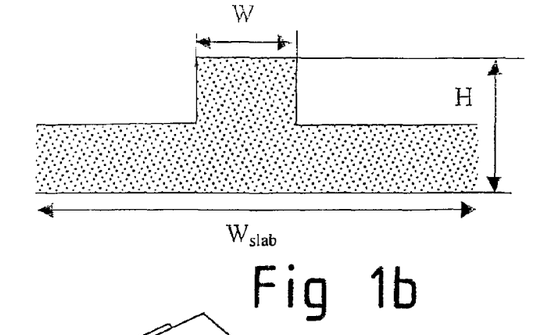

In some optical applications, there is a need to couple light efficiently between the fundamental modes of two different waveguides, the first and the second waveguide. With respect to waveguiding properties, the two waveguides are characterized by their cross-sections, which can have different sizes, shapes and refractive index differences, or in general, different refractive index distributions. The cross-sections determine the field distributions of the waveguide modes, including the fundamental mode. FIG. 1 represents the core geometries for two typical waveguide types, namely a strip waveguide shown in FIG. 1a and a rib waveguide shown in FIG. 1b. The core is usually surrounded by a lower-index cladding material not shown in FIGS. 1a and 1b, or materials, which can be solid matter, gas or even liquid.

In case of waveguides on planar substrates (i.e. on waveguide chips or wafers), the width W of the waveguide can often be easily modified (e.g. by changing the linewidth in a photolithographic mask), but the waveguide thickness H is much more difficult to manipulate. Often the waveguides are formed by etching evenly deep trenches or by depositing evenly thick material layers on top of the substrate. Continuous changes in layer thicknesses along the propagation direction are often difficult to realize on planar substrates. Therefore, in light coupling between different waveguides the difference in waveguide thicknesses or, in particular, in the vertical intensity distributions of the optical fields, is often more crucial than any differences in the horizontal direction. Therefore, it is essential to find a way to efficiently couple light between thin and thick waveguides, or thin and thick waveguide fields.

In optical systems a single optical signal often propagates through several different waveguides or similar propagating media, which are each optimized for a given optical function. For example, an optical fiber may be used for long-haul transmission, a thick silicon waveguide may be used for efficient coupling with the fiber as well as for low-loss propagation on a silicon chip, and a thin silicon waveguide may be used for realizing miniaturized optical circuits and fast optical modulators on a silicon chip. Also, light emitting diodes, lasers and optical detectors have various different sizes and shapes. These may also have to be coupled to the waveguides, which often influences the design for different waveguide cross-sections. As it is often unpractical to propagate light only along one type of waveguide, low-loss coupling of the fundamental mode between different waveguides is a crucial challenge in realizing optical systems.

It is preferred to realize the first and the second waveguide, as well as the coupling means between them, on a common chip or substrate. Then it is possible to align the waveguides and the coupling means lithographically on a wafer scale, which avoids the typical increase in cost and loss associated with active and passive alignment of separate optical subcomponents and, especially, small waveguides.

Direct butt-coupling, i.e. aligning the two waveguides successively along a common line, is the most straight-forward method for waveguide coupling, but this often results in high coupling losses, especially when the field distributions of the waveguides are clearly different. This method can be successfully used if the field distributions are sufficiently similar, e.g. between an optical fiber (core diameter ~9 µm) and a size-matched silicon waveguide (width and height ~9 µm).

Many other methods and coupling structures have been proposed for this important task, each having their own advantages and drawbacks.

One known coupling structure is a horizontal taper with a continuously changing waveguide width. The taper is placed between the first and the second waveguide, so that they are all aligned successively with respect to each other. This method is easy to implement on waveguide chips, but it cannot efficiently compensate for the field-mismatch in the vertical direction. However, it is often used in conjunction with other coupling methods to minimize the horizontal field-mismatch.

Another known coupling structure is a vertical taper with a continuously changing waveguide thickness. This is similar to the horizontal taper, but much more difficult to realize in practise due to the above mentioned limitations in planar processing.

Figure 2:
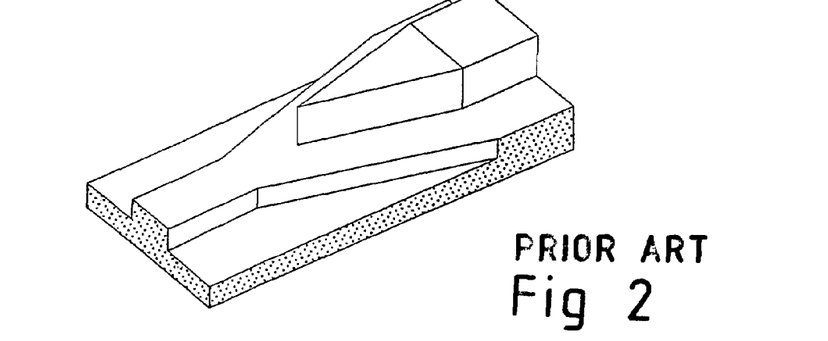

Another known coupling structure is a vertical taper consisting of more than one etch step on each side of the waveguide core, as described e.g. in U.S. Pat. No. 6,108,478, and illustrated in FIG. 2. In such a taper the thickness of the waveguide changes abruptly in the tip of the upper taper, but the vertical field distribution of the fundamental mode changes gradually between the first and the second waveguide. Such a taper can be easily fabricated by etching trenches into a homogeneous silicon-on-insulator (SOI) layer in two or more successive etching steps. However, after such a process the thickness uncertainty of the thinner waveguide is a combination of the uncertainties in the original silicon layer thickness (e.g. +/−500 nm in bonded SOI wafers) and the etch depths (e.g. 5-10%). For many practical applications such an uncertainty is too much. Epitaxial growth of silicon may reduce the thickness uncertainty, but it also increases the complexity and costs in fabrication.

One set of known coupling structures is parallel couplers that couple light between two parallel and different waveguides that are positioned side by side or on top of each other, or in some cases even within each other. Coupling of light with these parallel couplers between two clearly dissimilar waveguide cores can be based on grating assisted coupling, directional coupling or adiabatic coupling. Grating assisted coupling typically involves problems, such as expensive fabrication, high coupling loss, and dependency on wavelength and polarization. Adiabatic coupling means that the optical power does not couple from the fundamental mode to higher-order modes. It requires sufficiently long tapers and couplers (slow transformations in waveguide cross-section along the structure).

Figures 3A, 3B:
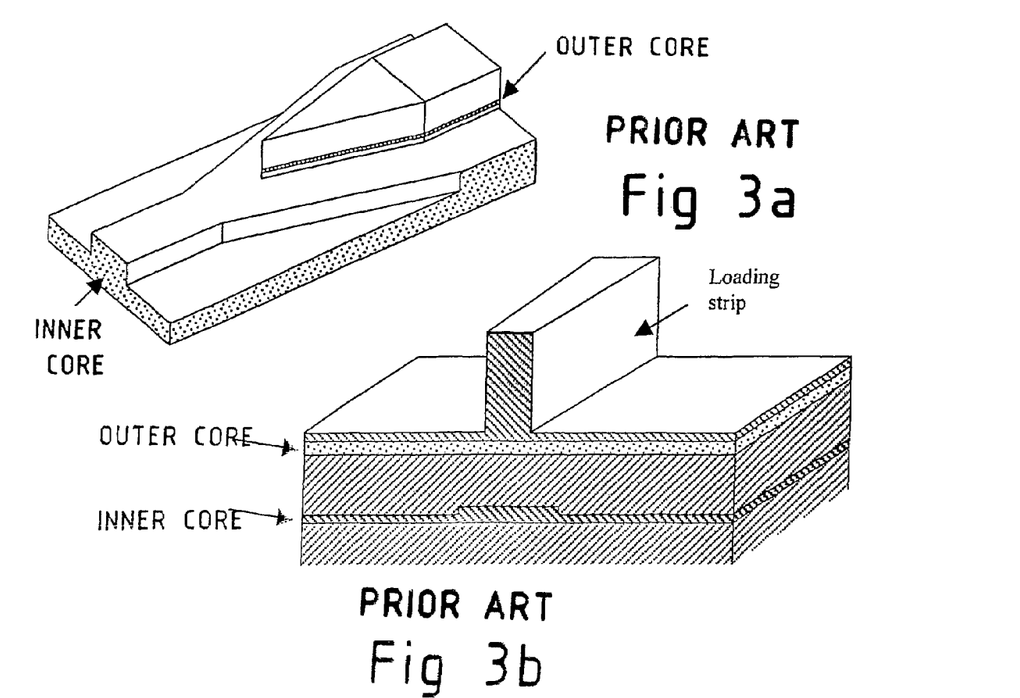
FIG. 3 shows two prior art coupling structures with two cores.
Figure 4A:
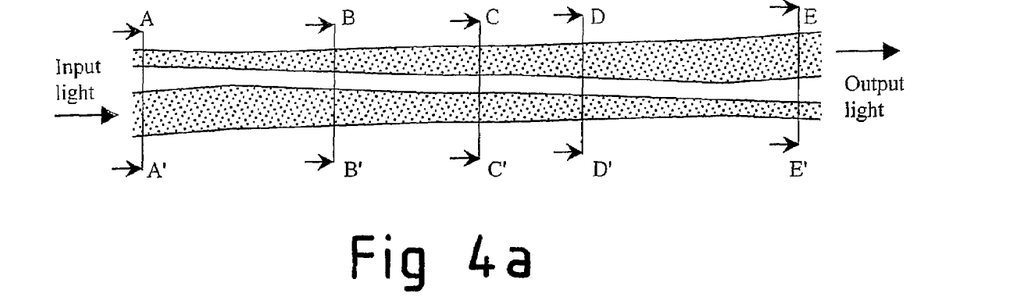
Figure 4B:
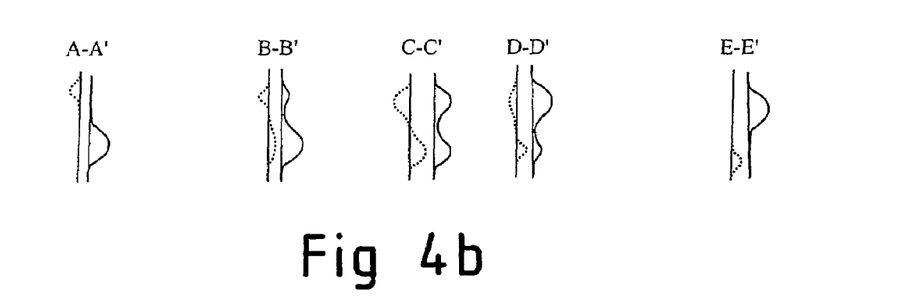

Known variations of directional couplers and adiabatic couplers are described e.g. in U.S. Pat. No. 6,282,345 B1, U.S. Pat. No. 6,229,947 B1 and U.S. Pat. No. 6,310,995 B1, and illustrated in FIG. 3. These known couplers are typically fabricated from compound semiconductor materials, such as InP or GaAs, by epitaxial layer growth. In the directional coupler one input signal excites both system modes of the waveguide core pair, and the interference of the modes couples light between the two cores. This coupler is sensitive to its length and also somewhat sensitive to wavelength and polarization. Correspondingly, in the adiabatic coupler one input signal excites only one system mode of the waveguide core pair, and adiabatic transformation of the system mode's field distribution couples light between the two cores. This is schematically illustrated in FIG. 4 for a two dimensional case (solid line=lowest system mode, i.e. the fundamental mode, dotted line=second-lowest system mode). The optical power of the waveguide pair's fundamental mode is mostly confined by the waveguide that has a higher effective index when considered alone, i.e. without the other waveguide. The power ratio between the waveguides reverses around that point where the effective indices cross. It should be noted that in FIG. 4 the widths of the waveguides determine their effective indices, but in a physical three-dimensional structure the effective indices depend on the whole refractive index distribution, including the effects of core width and height, as well as the refractive indices of all the materials. Adiabatic coupling is typically not sensitive to wavelength, but it often requires longer coupling length than interferometric coupling. All of these parallel coupler types, and particularly the known adiabatic coupler structures, represent the technology which is closest to the invention and corresponds to the preambles of claims 1 and 13.

In all the above mentioned vertical tapers and parallel couplers the top surface involves deep trenches or at least high non-planarity in the wafer-scale. This poses severe limitations and difficulties to the further processing of the wafer. For example, patterning of narrow metal strips, such as electrodes or heaters, flip-chip bonding, and hermetic sealing of the chip become more and more difficult as the maximum trench depth increases on top of the wafer. Often such processes need to be done after the waveguide patterning due to restrictions e.g. in process temperatures. It is difficult to pattern anything on top of ribs surrounded by deep trenches and even more difficult to pattern anything to the bottom of deep trenches, surrounded by thick ribs. Nevertheless, there is often a need to pattern metal contacts etc. on top of waveguides, and particularly on top of the thinner waveguides that in the known coupling structures are typically surrounded by much thicker ribs.

In some applications there is a need to seal the top surface of a waveguide chip hermetically, and this can be done by attaching a cap on top of the chip with e.g. direct bonding or glueing. Using any of the known vertical tapers or parallel couplers leaves deep trenches on the surface, which makes the hermetic sealing quite difficult or at least requires some kind of planarization before the cap attachment.

At least in silicon technology, there is a lack of an optical coupler that efficiently couples light between a thin and a thick waveguide, provides good thickness tolerance for the thinner waveguides, enables easy patterning of metal contacts etc. on top of the thinner waveguides, and maintains good planarity of the top surface.

PURPOSE OF THE INVENTION

The purpose of the invention is to provide an optical coupler that efficiently couples light between a thin and a thick waveguide, provides good thickness tolerance for the thinner waveguides, enables easy patterning of metal contacts etc. on top of the thinner waveguides, and maintains good planarity of the top surface. Furthermore, the purpose of the invention is to provide a method for manufacturing such a coupler.

SUMMARY OF THE INVENTION

The coupling structure of the invention is characterised in what is disclosed in claim 1. The fabrication method of the invention is characterised in what is disclosed in claim 13.

The structure comprises an inner waveguide disposed inside the structure and an outer waveguide disposed on top of and longitudinally in alignment with the inner waveguide, each of the inner and outer waveguides having a refractive index of at least 2.5 and being arranged on a common planar substrate.

According to the invention, the inner waveguide is a strip waveguide having a substantially rectangular cross-section and patterned into an inner core layer. The outer waveguide is a rib waveguide which is thinner than the inner waveguide and patterned into an outer core layer. The cores of the inner and outer waveguides are separated by a gap, the thickness of said gap being less than 500 nm. The optical power is coupled from one waveguide to another by changing the width of at least one of the waveguides forming thereby a longitudinal coupling region along the coupler.

In one embodiment of the invention, an inner core layer is silicon.

In one embodiment of the invention, the outer core layer is silicon. Preferably both waveguide cores are made of silicon and they have the same refractive index (~3.5), although this is not necessary.

In one preferred embodiment of the invention, the refractive index of the inner waveguide is substantially equal to the refractive index of the outer waveguide.

In one embodiment of the invention, the core width of the inner waveguide is changed while the core width of the outer waveguide remains unchanged along the coupling region of the coupler.

In one embodiment of the invention, the coupler has a first end and a second end, and at the first end the core width of the inner waveguide is higher than the core thickness of the inner waveguide while at the second end of the coupler the core width of the inner waveguide is smaller than the core thickness of said outer waveguide.

In one embodiment of the invention, the coupler is disposed to couple light efficiently between the fundamental modes of the inner waveguide and the outer waveguide.

In one embodiment of the invention, the thickness of the gap between the inner and outer core layers increases locally outside the coupling region for eliminating any unwanted optical coupling between the inner and outer core layers.

In one embodiment of the invention, at least somewhere outside the actual coupling region, like directly before or after the actual coupling region, the thickness of the gap between the inner and outer core layers is increased adiabatically along a multi-step tapering structure.

In one embodiment of the invention, at least somewhere outside the actual coupling region the inner waveguide is transformed from a highly multimoded strip waveguide into a rib waveguide that has only one or at least much less modes, the transformation being carried out adiabatically along a multi-step tapering structure.

In one embodiment of the invention, the coupler forms a micromechanical switch or modulator that is controlled by a relative movement of the inner and outer waveguides for changing the thickness of the gap between the waveguides.

In one embodiment of the invention, the coupler forms a polarizer or a polarization splitter.

In one embodiment of the invention, the inner waveguide forms a tip somewhere along the coupler, where $n_{\it{eff};1} < n_{\it{eff};2}$, so that in the second end of the coupler core width $W_1 = 0$.

The coupler according to the invention has the advantage that the thin outer core layer does not need to be patterned through, i.e. it can completely cover the deep trenches etched into the inner core layer. Therefore, the top surface remains highly planar, which enables easy post-processing after the waveguide patterning. Potential post-processing steps are e.g. deposition and patterning of additional thin films, formation of additional trenches, wafer or die bonding, and monolithic or hybrid integration in general. Metallic thin films are often needed to implement electrical contacts, wires or contact pads, heating resistors, flip-chip pads, solders for hermetic sealing etc., while dielectric thin films can be used e.g. for optical top claddings and diffusion barriers. Additional trenches are sometimes needed e.g. for fiber attachment, flip-chip bumps or passive alignment. Wafer or die bonding can be used for wafer or chip level integration, as well as for hermetic sealing with a separate cap. Another advantage of the unbroken outer core layer on top of the patterned lower core layer is that some structures patterned into the lower core layer can be hermetically sealed simply with the outer core layer. The ability to maintain a relatively planar top surface and an unbroken outer core layer does not exclude the possibility to etch deep trenches through the outer core layer.

The coupler according to the invention also has the advantage that, as a whole, its operation can be insensitive to most of the structural parameters, such as the core thicknesses of the inner and outer waveguides and slab thickness, core widths of the inner and outer waveguides, refractive indices of the waveguides, the separating gap and the various cladding materials, thickness of the separating gap, horizontal and longitudinal alignment between the two waveguides, and the sharpness of the taper tip in case of a vanishing core width along the coupler, although all these parameters slightly affect the exact position where light couples from one waveguide to another along the adiabatic taper.

The coupler according to the invention also has the advantage that its internal dependency on the thickness of the separating gap can be used to implement a micromechanical switch or modulator, where a relatively small movement of less than 500 nm can radically change the amount of light coupling from one waveguide to another along the adiabatic coupler.

The coupler according to the invention also has the advantage that as a whole its operation can be insensitive to wavelength and polarization, although the different wavelengths and especially polarizations may couple from one waveguide to another in a slightly different position along the adiabatic taper.

The coupler according to the invention also has the advantage that its internal polarization dependency can be used to implement a polarizer or a polarization splitter, where only one polarization is allowed to couple from one waveguide to another. This can be realized by designing the coupler so that between its ends the effective indices of the two waveguides meet only with one polarization.

Figure 9:
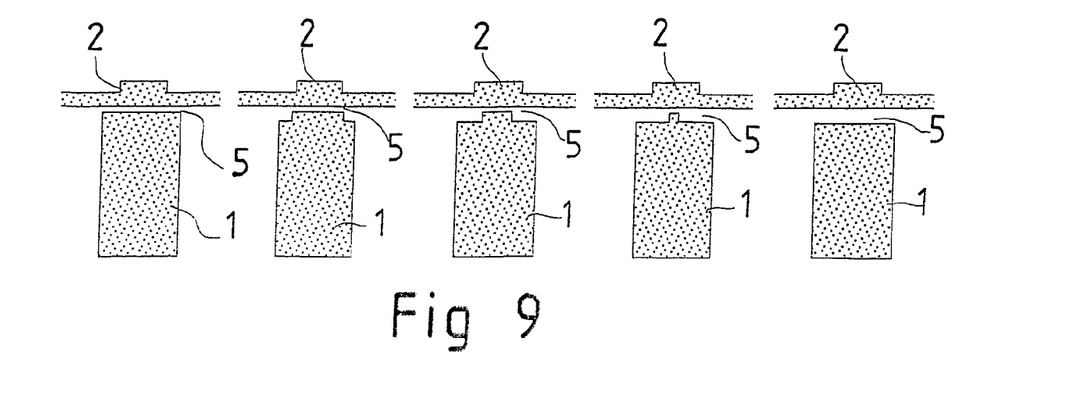
Figure 10:
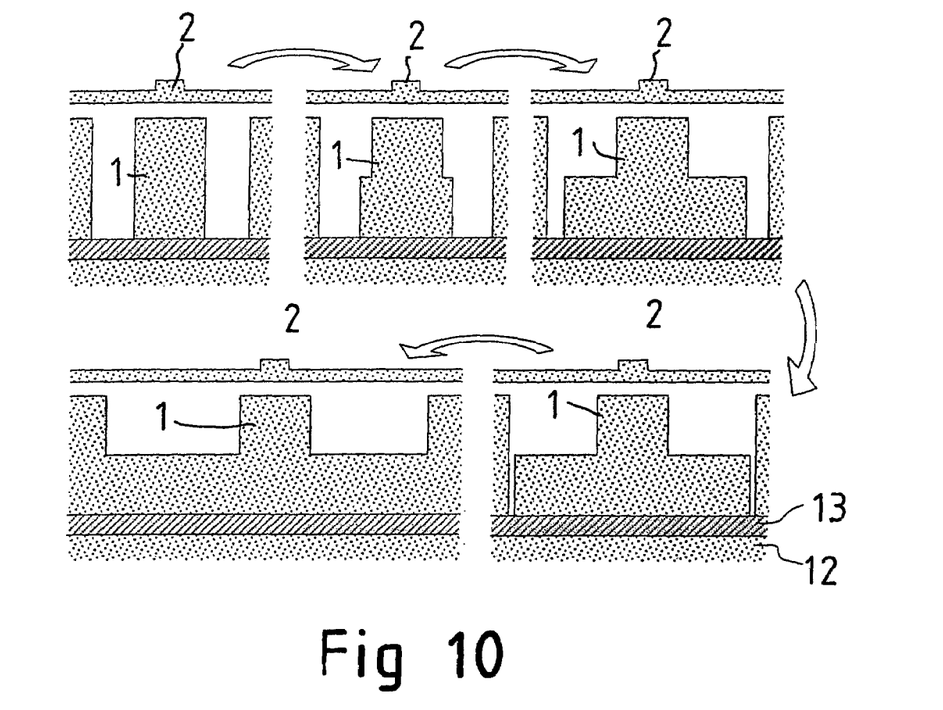

The coupler according to the invention also has the advantage that by using additional etch steps in the patterning of the lower core layer it is possible to locally increase the thickness of the separating gap between the two core layers in order to avoid any unwanted optical coupling between the layers outside the actual coupling region, or to transform the highly multimoded strip-shaped first waveguide into a rib waveguide that has only one or at least much less modes. These changes can be done along adiabatic transformers based on multi-step patterning. Examples of such transformations are illustrated in FIGS. 9 and 10 as different cross-sections along the adiabatic transformers.

It is also possible to control the heat conductivity of the outer core layer by the patterning of the inner core layer (e.g. silicon conducts heat very well, oxide clearly worse, and air very badly). If the outer layer around the warm area is partly or entirely cut by separating trenches, then the heat conducts mainly inwards, very well through a thin oxide layer or very badly through a thick air gap.

In the method, according to the invention,
an inner silicon layer is arranged on a planar substrate to form an inner core layer,
the first waveguide is patterned into the inner core layer by etching trenches around the waveguide core,
an outer silicon layer, which is thinner than the inner silicon layer is attached on top of the patterned inner core layer and the first waveguide to form an outer core layer so that the thickness of the gap between the outer core layer and the first waveguide is less than 500 nm, and
the second waveguide is patterned into the outer core layer, In the completed structure the first waveguide is an inner waveguide which is embedded in the structure and the second waveguide is an outer waveguide which is on top of the inner waveguide and on or adjacent the surface of the structure.

In one embodiment of the method, the inner and outer core layers are made of monocrystalline silicon.

In one embodiment of the method, after the patterning of inner waveguide into the inner core layer
the outer silicon layer is arranged on top of a handle wafer, which is much thicker than the outer silicon layer,
the outer silicon layer and the handle wafer are then attached on top of the patterned inner core layer leaving a thin separating gap between the outer silicon layer and the inner waveguide, and
the handle wafer is detached from the outer silicon layer in order to allow the lithographic patterning of the outer silicon layer.

In one embodiment of the method, a buried oxide layer is arranged between the outer silicon layer and the handle wafer.

In one embodiment of the method, before the attachment on top of the patterned inner core layer the unpatterned outer silicon layer and the handle wafer form a silicon-on-insulator wafer, and after said attachment the handle wafer is removed by grinding and/or etching and thereafter the buried oxide layer is removed by a highly selective etching process which does not reduce the surface quality of the outer silicon layer.

In one embodiment of the method, a thin defect layer, such as an implanted hydrogen layer, is arranged between the outer silicon layer and the handle wafer. The method of using a hydrogen layer is similar as e.g. in a prefabricated smart-cut wafer with an implanted hydrogen layer.

In one embodiment of the method, after the attachment on top of the patterned inner core layer the handle wafer is detached from the outer silicon layer along the defect layer, as is done e.g. during the fabrication of said smart-cut wafer, and the surface quality of the outer silicon layer is then improved by e.g. polishing.

In one embodiment of the method, additional trenches, are etched into the inner core layer in order to locally increase the thickness of the separating gap between the inner core layer and outer core layer.

In one embodiment of the method, additional trenches are etched into the inner core layer in order to form an adiabatic transformer that converts the strip-shaped inner waveguide to a rib waveguide.

The manufacturing method according to the invention has several options to realize the separating gap between the two core layers. Only the thin gap between the two waveguide cores can be filled e.g. by growing a thin layer of e.g. silicon dioxide on top of the thicker silicon layer either before or after its patterning. Alternatively, an air gap can be left between the core layers e.g. by selectively removing the same layer from the coupling-region. Alternatively, a uniform layer of e.g. silicon dioxide can be grown on top of the thinner silicon layer before it is attached on top of the lower core layer, resulting in an uniform material layer between the two silicon layers.

The manufacturing method according to the invention has the advantage that both the thin outer core layer and the thick inner core layer can be patterned starting from a planar top surface and the final waveguide core thickness can be essentially the same as the original core layer thickness. This enables accurate waveguide patterning and results in good tolerances for the layer thicknesses and trench depths. This is particularly advantageous for the thin upper core layer, where the critical waveguide components, such as splitters, combiners, and wavelength multiplexers, are preferably implemented.

BRIEF DESCRIPTION OF THE DRAWINGS

In the following, the invention is explained in detail with the description of embodiments and with reference to the accompanying drawings, where FIGS. 1a and 1b schematically show two common waveguide types with a different core geometry, namely a) a strip waveguide (rectangular core) and b) a rib (or ridge) waveguide, FIG. 2 schematically shows a prior art vertical taper structure realized with multi-step patterning, FIGS. 4a and 4b illustrate the basic principle of adiabatic coupling (2D), in FIG. 4a as a top view and in FIG. 4b with thick and thin lines representing the field distributions of the lowest and second-lowest system modes of the waveguide pair, respectively, FIG. 5 schematically shows a cross-section of an optical coupler according to one embodiment of the invention, FIG. 6 schematically presents a top view of an optical coupler according to one embodiment of the invention, the filled area illustrating the inner waveguide and the two straight lines illustrating the edges of the outer waveguide, FIG. 7 schematically presents different cross-sections of the coupling structure in FIG. 6, with contour plots schematically representing the optical powers propagating in the two waveguide cores, FIG. 8 schematically represents a cross-section of an optical coupler according to another embodiment of the invention, involving details of surrounding and supplementary structures, FIG. 9 schematically represents cross-sections of a structure according to a third embodiment of the invention, which adiabatically increases the separation gap between the two cores, FIG. 10 schematically presents cross-sections of a structure according to a fourth embodiment of the invention, which adiabatically changes a strip waveguide into a rib waveguide.

DETAILED DESCRIPTION OF THE INVENTION

The following embodiments show only adiabatic couplers having waveguides formed into two core layers. However, the same principle can be implemented in an adiabatic coupling between three or more superimposed core layers.

Figure 5:
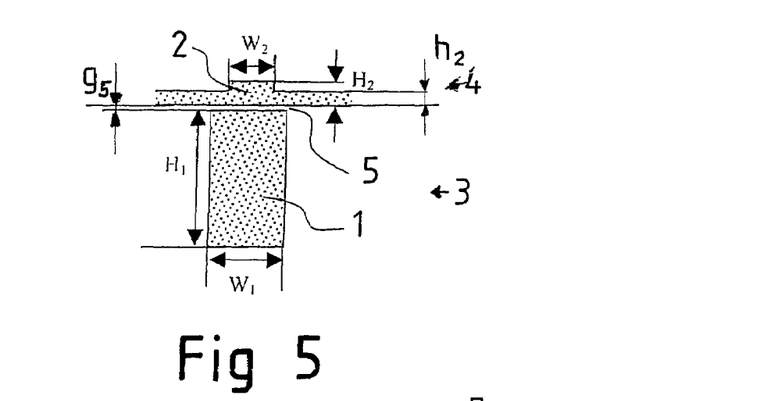
Figure 6:
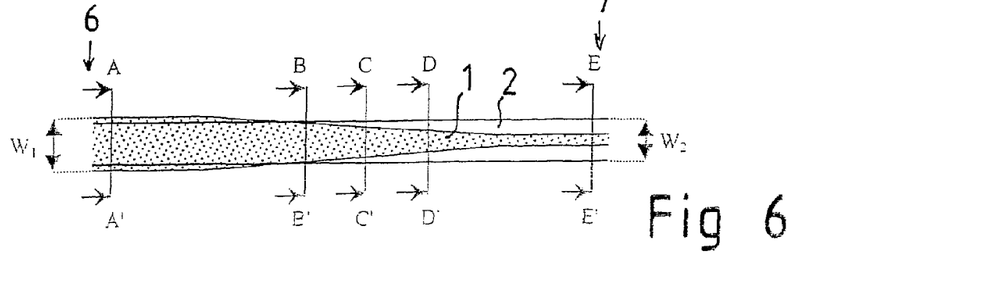

FIGS. 5 and 6 schematically show an embodiment of the structure according to the invention, comprising an adiabatic coupler for adiabatic coupling of light between two optical waveguides 1, 2. The structure comprises an inner waveguide 1 which is disposed inside the structure and an outer waveguide 2 which is disposed on top of and longitudinally in alignment with the inner waveguide 1. The inner and outer waveguides 1, 2 have a refractive index of at least 2.5. They are arranged on a common planar substrate 12, not shown in FIG. 5, but shown in FIG. 8. The inner waveguide 1 is a strip waveguide having a substantially rectangular cross-section and it is patterned into an inner core layer 3, see also FIG. 8. The outer waveguide 2 is a rib waveguide which is thinner than the inner waveguide 1 and is patterned into an outer core layer 4 (see also FIG. 8). The cores of the inner and outer waveguides 1 and 2 are separated by a gap 5. The thickness $g_5$ of the gap 5 is less than 500 nm. The optical power is coupled from one waveguide to another by changing the width of at least one of the waveguides forming thereby a longitudinal coupling region along the coupler.

A cross-section of the coupler is shown in FIG. 5, and in a plane view schematically seen in FIG. 6. In the first end 6 of the coupler the effective index $n_{eff,1}$ of the inner waveguide 1, when considered without the other waveguide, is higher than the effective index $n_{eff,2}$ of the outer waveguide 2, i.e. $n_{eff,1} > n_{eff,2}$. Then the optical power of the waveguide pair's lowest system mode, i.e. its fundamental mode, is mostly confined into the core of the inner waveguide 1. In the second end of the coupler the order of the effective indices is reversed, i.e. $n_{eff,1} < n_{eff,2}$, and the optical power of the waveguide pair's fundamental mode is mostly confined into the core of the outer waveguide 2. In both ends, the optical power distribution of the waveguide pair's second-lowest system mode is approximately opposite to that of the fundamental mode. The thickness $g_5$ of the separating gap 5 between the two waveguides needs to be sufficiently small and at least smaller than 500 nm in order to enable sufficient optical coupling between the two waveguides.

Along the coupler, the optical power distribution of the waveguide pair's 1, 2 fundamental mode slowly transforms, so that most of the power is shifted from the inner waveguide 1 into the outer waveguide 2. The operational principle is the same as that depicted in FIG. 4, with the fundamental mode of the waveguide pair 1, 2 corresponding to the solid field line. The transformation can be obtained by changing the width ($W_1$ and/or $W_2$) of at least one of the waveguides 1, 2 along the coupling structure. As shown in FIG. 6, preferably at least the core width $W_1$ of the inner waveguide 1 is changed, so that in the first end 6 of the coupler it is higher than the core thickness $H_1$ of the inner waveguide 1, while in the second end 7 of the coupler it is smaller than or at least close to $H_2$.

Preferably both waveguide cores 1, 2 are made of silicon and they have the same refractive index (~3.5), although this is not necessary.

FIG. 6 schematically describes a top-view of one embodiment of the invention, where only $W_1$ is varied along the coupler. Filled area describes the core of the inner waveguide 1, while the solid lines describe the edges of the outer waveguide 2.

Figure 7:
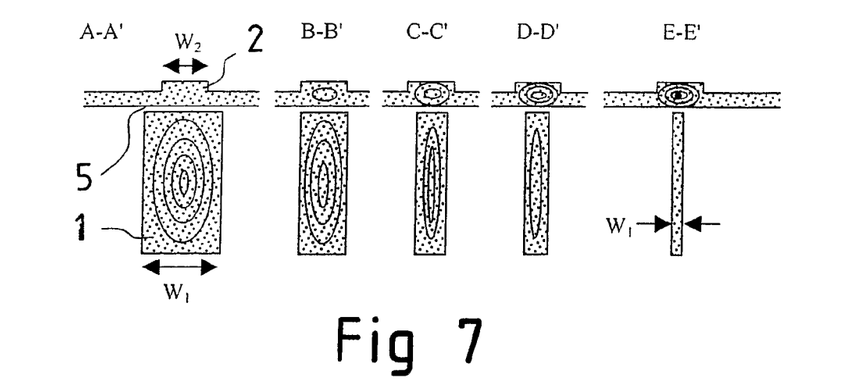

FIG. 7 schematically shows the cross-sections A-A', B-B', C-C', D-D' and E-E' of the coupler of FIG. 6 in the positions marked in FIG. 6, including schematic intensity distributions of the fundamental mode as contour plots.

Figure 8:
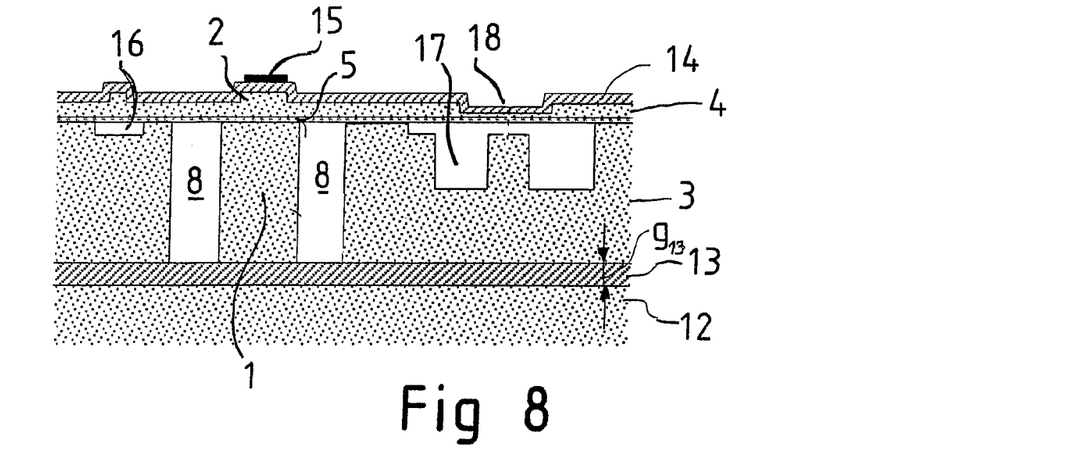

An example of a practical implementation of the invention with silicon technology is presented in FIG. 8 as a cross-section involving details of surrounding and supplementary structures, such as the substrate 12, lower cladding, 13, filled separating gap 5, top cladding 14, patterned thin film resistor 15 on top of the outer waveguide 2, and various additional trenches 16, 17, 18.

As seen in FIGS. 5 and 7, the inner silicon waveguide 1 has a core thickness $H_1$ much higher than its core width $W_1$, so that its effective index $n_{eff,1}$ is mostly determined by the width $W_1$. Similarly, the second silicon waveguide 2 has a sufficiently high core width $W_2$ compared to its thickness $H_2$, so that its effective index $n_{eff,2}$ is mostly determined by the thickness $H_2$. It should, though, be noted that $n_{eff,2}$ depends also on the thickness of the silicon slab surrounding the rib. With these conditions the effective indices of the two waveguides 1 and 2 reach the same value, i.e. $n_{eff,1}=n_{eff,2}$, when $W_1 \approx H_2$. When compared to other adiabatic couplers with dissimilar core materials, as well as to a vertical multistep taper (see FIG. 2), at least the coupler according to this preferred embodiment of the invention avoids the need for an extremely sharp tip.

Referring again to FIG. 5, in one embodiment of the structure the thickness $H_1$ of the inner waveguide 1 is in a range 2-20 μm, preferably 3-12 μm, more preferably 8-10 μm. $H_2/H_1$ is in a range 0.05-0.5, preferably 0.1-0.4, $H_2$ being the thickness of the outer waveguide 2. The thickness of the separating gap $g_5$<500 nm, preferably 20-200 nm. The thickness $g_{13}$ of the lower cladding 13 between the inner core layer and the substrate 12 $g_{13}$>200 nm, preferably 500-1000 nm (to avoid substrate coupling). The minimum width of a slab around rib waveguide $W_{slab(1,2)}/W_{(1,2)}$>3, preferably >5, so that the fundamental mode in a rib waveguide is fully confined into that range and does not "see" outside that range. However, in single-moded rib waveguides it should be ensured that the higher-order modes can freely radiate away from that range $h_2$ being the thickness of the silicon slab around the rib of the outer waveguide, $h_2/H_2$=0.3-0.8, preferably 0.4-0.6 (to eliminate higher order vertical modes in single-moded rib waveguides, similar condition for the optional inner rib waveguide).

FIG. 9 schematically shows cross-sections taken from different longitudinal positions of a structure, which adiabatically increases the separation gap 5 between the inner waveguide 1 and the outer waveguide 2 along a multi-step tapering structure outside the coupling region.

FIG. 10 shows cross-sections taken from different spaced longitudinal positions of a structure, in which outside the coupling region the inner waveguide 1 is transformed from a highly multimoded strip waveguide into a rib waveguide that has only one or at least much less modes, the transformation being carried out adiabatically along a multi-step tapering structure.

With regard to the fabricating method, FIGS. 12 to 17, show the steps for fabricating the structure comprising an adiabatic coupler for adiabatic coupling of light between two optical waveguides 1 and 2.

Figure 12:
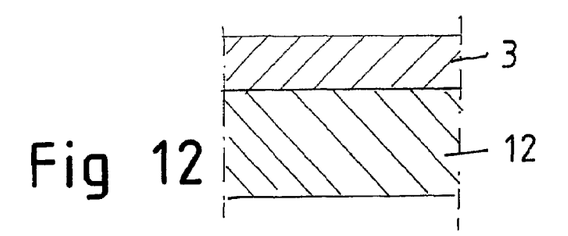
FIGS. 12-17 show different steps of one embodiment of the method of the invention.

As seen in FIG. 12, an inner silicon layer 3 of monocrystalline silicon is first arranged on a planar silicon substrate 12 to form an inner core layer 3.

Figure 13:
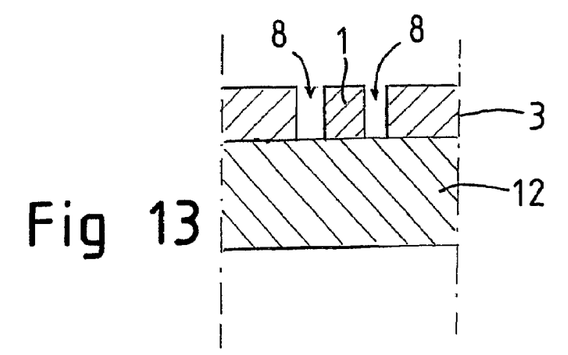
Figure 17:
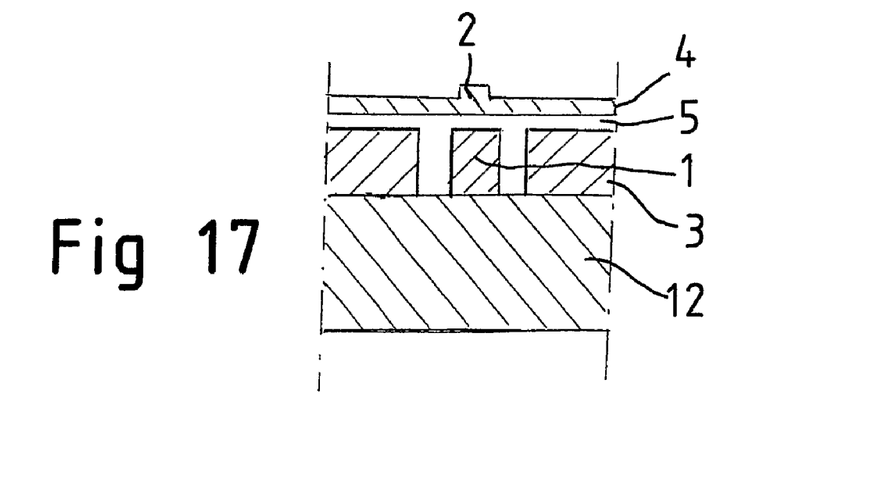

As seen in FIG. 13, the first waveguide 1 is patterned into the inner core layer 3 by etching trenches 8 around the waveguide core so as to form an inner waveguide 1 in the complete structure of FIG. 17. The first (inner) waveguide 1 is a strip waveguide having a substantially rectangular cross-section.

Figure 14:
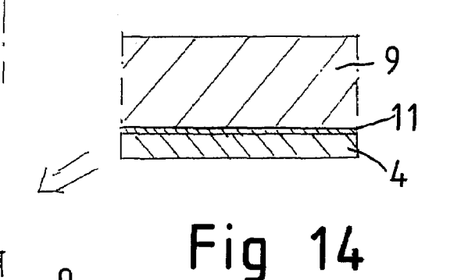

As seen in FIG. 14, an outer silicon layer 4 is arranged on top of a handle wafer 9, which is much thicker than the outer silicon layer 4. A buried oxide layer 10 (not shown) or defect layer 11, such as an implanted hydrogen layer, can be arranged between the outer silicon layer 4 and the handle wafer 9.

Figure 15:
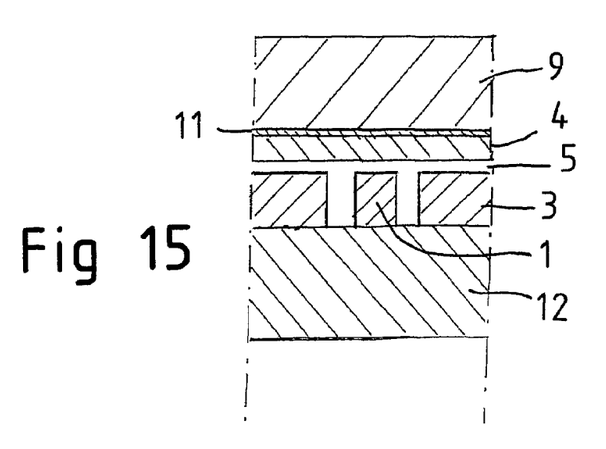

As seen in FIG. 15, the outer silicon layer 4 and the handle wafer 9 are then attached on top of the patterned inner core layer 3 leaving a thin separating gap 5, which is less than 500 nm, between the outer silicon layer 4 and the inner waveguide 1. The separating gap 5 can be an air gap or filled with some material. For example, the separating gap can be made of a thin oxide layer (not shown) that is deposited on top of the first or the second silicon layer 3, 4 before arranging them on top of each other. Alternatively, an air gap can be left between the outer silicon layer 4 and the inner waveguide 1 by placing fixtures (not shown), such as thin patterned oxide layers, that attach the two silicon layers together, only outside the coupling region.

Figure 16:
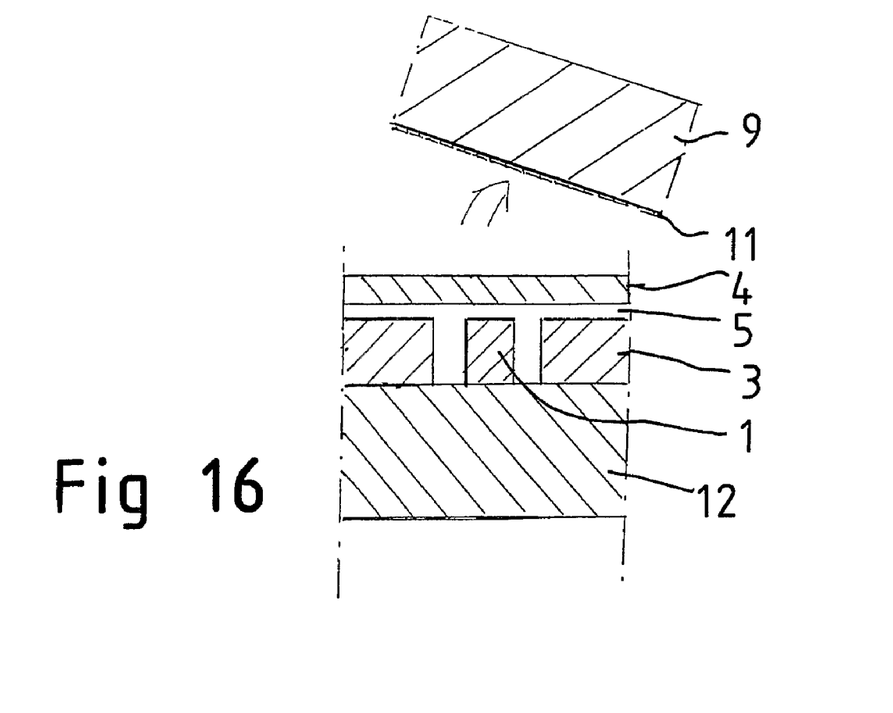

As seen in FIG. 16, the handle wafer 9 is detached from the outer silicon layer 4. The handle wafer 9 is detached from the outer silicon layer 4 along the defect layer 11 and the surface quality of the outer silicon layer 4 is then improved by e.g. polishing.

As seen in FIG. 17, the second waveguide 2 is then patterned lithographically into the outer silicon core layer 4.

The defect layer 11 can be replaced by an oxide layer 10, whereby before the attachment on top of the patterned inner core layer 3 the unpatterned outer silicon layer 4 and the handle wafer 9 form a silicon-on-insulator wafer. After said attachment the handle wafer 9 is removed by grinding and/or etching and thereafter the buried oxide layer 10 is removed by a highly selective etching process which does not reduce the surface quality of the outer silicon layer 4.

Additional trenches, can also be etched into the inner core layer 3 in order to locally increase the thickness $g_5$ of the separating gap 5 between the inner core layer 3 and outer core layer 4, as shown in FIG. 9.

Again, referring to FIG. 10, additional trenches can also be etched into the inner core layer 3 in order to form an adiabatic transformer that converts the strip-shaped inner waveguide 1 to a rib waveguide.

EXAMPLE

The operation of a coupling structure according to the invention was simulated with full-vectorial modal analysis by using a commercial TempSelene software. In the simulation the following parameters and dimensions were used: TE polarization, calculation area 8×12 μm² (64×512 points), λ=1550 nm, $H_1$=8 μm, $H_2$=3 μm, $h_2$=1.5 μm, $W_2$=3 μm, and $g_5$=50 nm. Furthermore, the refractive index was 3.5 (silicon) for both waveguide cores, 1.5 (oxide) for a thin buffer layer on top of the inner waveguide 1 filling the separating gap 5, and 1 (air) for the surrounding background material. Along the adiabatic coupling structure the width $W_1$ of the lower waveguide core was changed from 3 to 2.8 μm.

Figure 11:
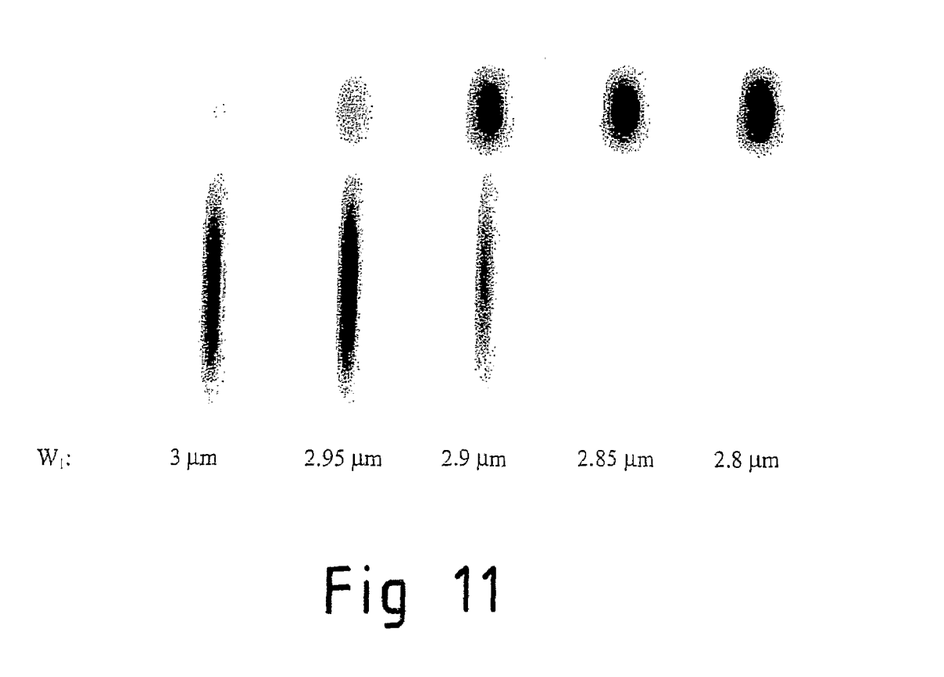
FIG. 11 presents simulation results that demonstrate the coupling of light between the first and the second waveguide in a coupler according to one embodiment of the invention.

FIG. 11 presents the simulated intensity distribution of the fundamental TE mode in different cross-sections of the adiabatic coupling structure. It clearly demonstrates the coupling of light from the inner waveguide to the outer waveguide. Further off from the range $W_1$=3-2.8 μm, practically all the power of the fundamental mode is confined only into one of the two waveguides.

The invention is not limited to concern the above presented embodiment examples only, but many variations are possible within the inventional idea determined by the claims.

The invention claimed is:

1. A structure comprising an adiabatic coupler for adiabatic coupling of light between two optical waveguides (1, 2), said structure comprising an inner waveguide (1) disposed inside the structure and an outer waveguide (2) disposed on top of and longitudinally in alignment with the inner waveguide (1), each of the inner and outer waveguides having a refractive index of at least 2.5 and being arranged on a common planar substrate, wherein the inner waveguide (1) is a strip waveguide having a substantially rectangular cross-section and patterned into an inner core layer (3); that the outer waveguide (2) is a rib waveguide which is thinner than the inner waveguide and patterned into an outer core layer (4), and that the cores of the inner and outer waveguides are separated by a gap (5) the thickness ($g_5$) of said gap (5) being less than 500 nm, whereby the optical power is coupled from one waveguide to another by changing the width of at least one of the waveguides forming thereby a longitudinal coupling region along the coupler.

2. A structure according to claim 1, wherein the inner core layer (3) is silicon.

3. A structure according to claim 1, wherein the outer core layer (4) is silicon.

4. A structure according to claim 1, wherein the refractive index of the inner waveguide (1) is substantially equal to the refractive index of the outer waveguide (2).

5. A structure according to claim 1, wherein the core width ($W_1$) of the inner waveguide (1) is changed while the core width ($W_2$) of the outer waveguide (2) remains unchanged along the coupling region of the coupler.

6. A structure according to claim 1, wherein the coupler has a first end (6) and a second end (7), and that at the first end (6) the core width ($W_1$) of the inner waveguide (1) is higher than the core thickness ($H_1$) of the inner waveguide (1) while at the second end (7) of the coupler the core width ($W_1$) of the inner waveguide (1) is smaller than the core thickness ($H_2$) of said waveguide (2).

7. A structure according to claim 1, wherein the coupler is disposed to couple light efficiently between the fundamental modes of the inner waveguide (1) and the outer waveguide (2).

8. A structure according to claim 1, wherein the thickness of the gap (5) between the inner and outer core layers (3, 4) increases locally outside the coupling region for eliminating any unwanted optical coupling between the inner and outer core layers.

9. A structure according to claim 8, wherein the thickness of the gap (5) between the inner waveguide (1) and the outer waveguide (2) increases adiabatically along a multi-step tapering structure outside the coupling region 3.

10. A structure according to claim 1, wherein outside the coupling region the inner waveguide (1) is transformed from a highly multimoded strip waveguide into a rib waveguide that has only one or at last much less modes, the transformation being carried out adiabatically along a multi-step tapering structure.

11. A structure according to claim 1, wherein the coupler forms a micromechanical switch or modulator that is controlled by a relative movement of the inner and outer waveguides (1, 2) for changing the thickness of gap (g3) between the waveguides.

12. A structure according to claim 11, wherein the coupler forms a polarizer or a polarization splitter.

13. A method for manufacturing a structure comprising an adiabatic coupler for adiabatic coupling of light between two optical waveguides, a first waveguide (1) and a second waveguide (2), each of the waveguides having a silicon core and being arranged on a common silicon substrate, the first waveguide (1) being a strip waveguide having a substantially rectangular cross-section and the second waveguide (2) being a rib waveguide which is thinner than the inner waveguide wherein an inner silicon layer (3) is arranged on a planar substrate (12) to form an inner core layer (3), the first waveguide (1) is patterned into the inner core layer (3) by etching trenches (8) around the waveguide core, an outer silicon layer (4), which is thinner than the inner silicon layer (3) is attached on top of the patterned inner core layer (3) and the first waveguide (1) to form an outer core layer (4) so that the thickness of the gap (5) between the outer core layer (4) and the first waveguide (1) is less than 500 nm, and the second waveguide (2) is patterned into the outer core layer (4), so that in the completed structure the first waveguide (1) is an inner waveguide which is embedded in the structure and the second waveguide (2) is an outer waveguide which is on top of the inner waveguide and on or adjacent the surface of the structure.

14. Method according to claim 13, wherein the inner and outer core layers (3, 4) are made of monocrystalline silicon.

15. Method according to claim 13 wherein after the patterning of inner waveguide (1) into the inner core layer (3)

the outer silicon layer (4) is arranged on top of a handle wafer (9), which is much thicker than the outer silicon layer (4), the outer silicon layer (4) and the handle wafer (9) are then attached on top of the patterned inner core layer (3) leaving a thin separating gap (5) between the outer silicon layer (4) and the inner waveguide (1), and the handle wafer (9) is detached from the outer silicon layer (4) in order to allow the lithographic patterning of the outer silicon layer (4).

16. Method according to claim 15, wherein a buried oxide layer (10) is arranged between the outer silicon layer (4) and the handle wafer (9).

17. Method according to claim 16, wherein before the attachment on top of the patterned inner core layer (3) the unpatterned outer silicon layer (4) and the handle wafer (9) form a silicon-on-insulator wafer, and after said attachment the handle wafer is removed by grinding and/or etching and thereafter the buried oxide layer (10) is removed by a highly selective etching process which does not reduce the surface quality of the outer silicon layer (4).

18. Method according to claim 15, wherein a thin defect layer (11), such as an implanted hydrogen layer, is arranged between the outer silicon layer (4) and the handle wafer (9).

19. Method according to claim 18, wherein after the attachment on top of the patterned inner core layer (3) the handle wafer (9) is detached from the outer silicon layer (4) along the defect layer (11) and the surface quality of the outer silicon layer (4) is then improved by e.g. polishing.

20. Method according to claim 13, wherein additional trenches, are etched into the inner core layer (3) in order to locally increase the thickness ($g_5$) of the separating gap (5) between the inner core layer (3) and outer core layer (4).

21. Method according to claim 13, wherein additional trenches are etched into the inner core layer (3) in order to form an adiabatic transformer that converts the strip-shaped inner waveguide (1) to a rib waveguide.

* * * * *